(12) United States Patent
Nakabo et al.

(10) Patent No.: US 8,443,127 B2
(45) Date of Patent: May 14, 2013

(54) CRADLE FOR PORTABLE CONTENT PLAYBACK APPARATUS AND AMPLIFYING DEVICE TO WHICH THE SAME CRADLE IS CONNECTED

(75) Inventors: Masatoshi Nakabo, Neyagawa (JP); Akifumi Fujieda, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 386 days.

(21) Appl. No.: 12/831,556

(22) Filed: Jul. 7, 2010

(65) Prior Publication Data

US 2011/0016249 A1    Jan. 20, 2011

(30) Foreign Application Priority Data

Jul. 16, 2009    (JP) ................. 2009-168054
Jul. 16, 2009    (JP) ................. 2009-168079
Aug. 25, 2009    (JP) ................. 2009-194707
Nov. 18, 2009    (JP) ................. 2009-262504
Mar. 8, 2010    (JP) ................. 2010-050969

(51) Int. Cl.
*G06F 13/00* (2006.01)

(52) U.S. Cl.
USPC ............................ 710/303; 710/316; 713/320

(58) Field of Classification Search .......... 710/300–306, 710/316–317; 713/320–340
See application file for complete search history.

(56) References Cited

U.S. PATENT DOCUMENTS

| 7,170,259 B2 | 1/2007 | Veselic |
| 7,631,203 B2 | 12/2009 | Irie |
| 7,885,622 B2 * | 2/2011 | Krampf et al. ............. 455/154.1 |
| 2006/0085577 A1 | 4/2006 | Takashima et al. |
| 2006/0200601 A1 * | 9/2006 | Sugihara et al. ................ 710/70 |
| 2007/0005840 A1 | 1/2007 | Cheng et al. |
| 2007/0211579 A1 | 9/2007 | Yoshimura et al. |
| 2008/0089667 A1 | 4/2008 | Grady et al. |
| 2008/0266783 A1 | 10/2008 | Mills et al. |
| 2009/0161891 A1 * | 6/2009 | Hou et al. ..................... 381/123 |

FOREIGN PATENT DOCUMENTS

| JP | 2001-242965 | 9/2001 |
| JP | 2005-006497 | 1/2005 |
| JP | 2005-190101 | 7/2005 |
| JP | 2006-114120 | 4/2006 |
| JP | 2006-142768 | 6/2006 |
| JP | 2006-174335 | 6/2006 |

(Continued)

OTHER PUBLICATIONS

EP Search Report for corresponding European Application No. 10 157 164.4 mailed May 22, 2012.

*Primary Examiner* — Brian Misiura
*Assistant Examiner* — Kim Huynh
(74) *Attorney, Agent, or Firm* — Renner, Otto, Boisselle & Sklar, LLP

(57) ABSTRACT

A cradle comprises a first connecting unit to which a portable content playback apparatus is connectable; a second connecting unit to which a computer is connectable; an output unit that outputs content data; a controller that controls the portable content playback apparatus; a hub that is connected to the second connecting unit, a first switch, and a second switch; the first switch that switches between connection of the first connecting unit to the controller and connection of the first connecting unit to the hub; the second switch that switches between connection of the output unit to the controller and connection of the output unit to the hub; and a switch control unit that controls switching of the first switch and the second switch.

15 Claims, 12 Drawing Sheets

FOREIGN PATENT DOCUMENTS

| | | |
|---|---|---|
| JP | 3121917 | 6/2006 |
| JP | 2006-244607 | 9/2006 |
| JP | 2007-068333 | 3/2007 |
| JP | 2007-243715 | 9/2007 |
| JP | 2007-306431 | 11/2007 |
| JP | 2007-329726 | 12/2007 |
| JP | 2008-136048 | 6/2008 |

* cited by examiner

CRADLE FOR PORTABLE CONTENT PLAYBACK APPARATUS AND AMPLIFYING DEVICE TO WHICH THE SAME CRADLE IS CONNECTED

BACKGROUND OF THE INVENTION

1. Field of the Invention

The present invention relates to a cradle for a portable content playback apparatus, and an amplifying device to which the cradle is connected.

2. Description of the Related Art

A personal computer (PC) or a portable content playback apparatuses (hereinafter referred to as a digital audio player (DAP)) is typically provided with a recording medium such as an HDD, and capable of recording audio files in the HDD and playing the audio files recorded in the HDD. (1) When playing an audio file recorded in the PC and listening to an audio content, the PC is connected to an amplifying device by a user operation. The PC decodes the audio file and transmits audio data to the amplifying device, and sound and voice are played by the amplifying device. (2) When transferring an audio file recorded in the PC to the DAP and recording the file in the DAP, the PC and the DAP are connected via an USB cable by a user operation. The PC transfers the audio file recorded in the HDD to the DAP, and the DAP records the transferred audio file in the HDD. (3) When playing an audio file recorded in the DAP and listening to an audio content, the DAP is connected to a cradle, and the cradle is connected to amplifying device by a user operation (see Japanese Patent publication NO. 2006-244607, for example). The DAP decodes the audio file and transmits audio data to the amplifying device via the cradle, and sound and voice are played by the amplifying device. In order to carry out the operations (1) to (3) described above, the PC, the DAP, the cradle, and the amplifying device are required to be connected and disconnected every time by the user operation, which is extremely cumbersome.

On the other hand, the DAP can be connected to the PC or the cradle via the USB, and a battery of the DAP is charged by the PC or the cradle supplying a voltage for electrical charge. Some DAPS are such that the battery of the DAP is charged by the voltage for electrical charge when a charging command is supplied from a host controller via datalines D+ and D− of the USB at a predetermined time interval, and not charged when the charging command is not supplied from the host controller at a predetermined time interval. Accordingly, a problem has been noted that, when the PC is turned off, even though the voltage for electrical charge is supplied from the PC to the DAP, the charging command is not supplied from the PC to the DAP and thus the battery of the DAP cannot be charged.

SUMMARY OF THE INVENTION

An object of the present invention is to provide a cradle for a portable content playback apparatus, and the cradle is capable of switching between states without requiring to connect and/or disconnect a plurality of devices by a user operation, the states including a state in which content data from the portable content playback apparatus is outputted through an output unit, and a state in which a content file from the computer is transferred to and recorded in the portable content playback apparatus.

Another object of the present invention is to provide a cradle for a portable content playback apparatus, and the cradle is capable of switching between states without requiring to connect and/or disconnect a plurality of devices by a user operation, the states including a state in which content data from the portable content playback apparatus is outputted through an output unit, a state in which content data from the computer is outputted through the output unit, and a state in which a content file from the computer is transferred to and recorded in the portable content playback apparatus.

According to a preferred embodiment of the present invention, a cradle comprises a first connecting unit to which the portable content playback apparatus is connectable; a second connecting unit to which a computer is connectable; an output unit that outputs content data; a controller that controls the portable content playback apparatus; a first switch that switches between connection of the first connecting unit to the controller and connection of the first connecting unit to the second connecting unit; and a switch control unit that controls switching of the first switch. In a portable content playback apparatus playback state in which the content data is received from the portable content playback apparatus and outputted from the output unit, the switch control unit causes the first switch to connect the first connecting unit with the controller, and when a content file from the computer is transferred to and recorded in the portable content playback apparatus, the switch control unit causes the first switch to connect the first connecting unit with the second connecting unit.

When the content data from the portable content playback apparatus is outputted through the output unit, the first switch connects the first connecting unit and the controller. Accordingly, the content data from the portable content playback apparatus is outputted through the output unit via the first connecting unit, the first switch, and the controller. When the content file from the computer is transferred to and recorded in the portable content playback apparatus, the first switch connects the first connecting unit and the second connecting unit. Accordingly, the content file from the computer is transferred to and recorded in the portable content playback apparatus via the second connecting unit, the first switch, and the first connecting unit. In this manner, it is not necessary to connect or disconnect a plurality of devices by a user operation.

Preferably, the cradle further comprises: a hub that is connected to the second connecting unit, the first switch, and a second switch; the second switch that switches between connection of the output unit to the controller and connection of the output unit to the hub. The first switch switches between connection of the first connecting unit to the controller and connection of the first connecting unit to the hub; a switch control unit controls switching of the first switch and the second switch, in the portable content playback apparatus playback state, the switch control unit causes the first switch to connect the first connecting unit with the controller, and causes the second switch to connect the output unit with the controller, in a computer playback state in which the content data is received from the computer and outputted from the output unit, the switch control unit causes the second switch to connect the output unit with the hub, and when a content file from the computer is transferred to and recorded in the portable content playback apparatus, the switch control unit causes the first switch to connect the first connecting unit with the hub.

When the content data from the portable content playback apparatus is outputted through the output unit, the first switch connects the first connecting unit and the controller, and the second switch connects the output unit and the controller. Accordingly, the content data from the portable content playback apparatus is outputted through the output unit via the first connecting unit, the first switch, the controller, and the second switch. When the content data from the computer is outputted through the output unit, the second switch connects the output unit and the hub. Accordingly, the content data from the computer is outputted through the output unit via the second connecting unit, the hub, and the second switch. When the content file from the computer is transferred to and recorded in the portable content playback apparatus, the first switch connects the first connecting unit and the hub. Accordingly, the content file from the computer is transferred to and recorded in the portable content playback apparatus via the second connecting unit, the hub, the first switch, and the first connecting unit. In this manner, it is not necessary to connect or disconnect a plurality of devices by a user operation.

Preferably, a downstream device is connected between the hub and the second switch, the downstream device receiving the content data from the computer through the hub and supplying the content data to the second switch, the downstream device being provided downstream with respect to the hub.

As the downstream device is always connected to the hub, the computer connected to the hub constantly recognizes the downstream device. Accordingly, when the second switch switches from the state in which the content data from the portable content playback apparatus is outputted through the output unit to the state in which the content data from the computer is outputted through the output unit, it is not necessary for the computer to recognize the downstream device again, and the content data from the computer can be immediately outputted through the output unit.

Preferably, when transferring the content file from the computer to the portable content playback apparatus and recording the content file in the portable content playback apparatus, the switch control unit causes the second switch to connect the output unit with the hub, thereby controlling so as to be able to receive the content data from the computer and output the content data through the output unit.

When the first switch connects the first connecting unit and the hub, it is not possible to output the content data from the portable content playback apparatus through the output unit. Accordingly, the content data from the computer can be outputted through the output unit by the second switch connecting the output unit and the hub.

Preferably, when canceling a state in which the content file from the computer is transferred to and recorded in the portable content playback apparatus, the switch control unit causes the first switch to connect the first connecting unit with the controller, and causes the second switch to maintain the connection of the output unit to the hub.

When canceling the state in which the content file from the computer is transferred to and recorded in the portable content playback apparatus, the second switch maintains the connection between the output unit and the hub. Accordingly, it is possible to prevent the output of the content data from the computer through the output unit is adversely interrupted despite the intention of the user.

Preferably, the cradle further comprising: a connection determination unit that determines whether or not the portable content playback apparatus is connected to the first connecting unit and whether or not the computer is connected to the second connecting unit, wherein when an instruction of outputting the content data from the portable content playback apparatus through the output unit has been inputted, if it is determined that the portable content playback apparatus is not connected to the first connecting unit, the switch control unit prevents the first switch and the second switch from switching, and when an instruction of outputting the content data from the computer through the output unit has been inputted, if it is determined that the computer is not connected to the second connecting unit, the switch control unit prevents the first switch and the second switch from switching.

In this case, in a case in which the instruction of outputting the content data from the portable content playback apparatus through the output unit is inputted due to an erroneous operation by the user when the portable content playback apparatus is not connected in the state in which the content data from the computer is outputted through the output unit, if the first switch and the second switch are switched in response to this instruction, the output of the content data from the computer is interrupted. However, according to this embodiment, the first switch and the second switch are not switched, and it is possible to solve such a problem. In a case in which the instruction of outputting the content data from the computer through the output unit is inputted due to an erroneous operation by the user when the computer is not connected in the state in which the content data from the portable content playback apparatus is outputted through the output unit, if the first switch and the second switch are switched in response to this instruction, the output of the content data from the portable content playback apparatus is interrupted. However, according to this embodiment, the first switch and the second switch are not switched, and it is possible to solve such a problem.

Preferably, the cradle further comprising: a first determination unit that determines whether or not the portable content playback apparatus is connected to the first connecting unit; and a second determination unit that determines whether or not the computer is connected to the second connecting unit when it is determined that the portable content playback apparatus has not been connected to the first connecting unit, wherein when it has been determined that the portable content playback apparatus is connected to the first connecting unit, the switch control unit causes the first switch to connect the first connecting unit with the controller, and causes the second switch to connect the output unit with the controller, and when it has been determined that the computer is connected to the second connecting unit, the switch control unit causes the first switch to connect the first connecting unit with the controller, and causes the second switch to connect the output unit with the hub.

In this case, when only one of the portable content playback apparatus and the computer is connected to the cradle, the first switch and the second switch are automatically switched to the state in which the content data from the device that is connected to the cradle is received and outputted through the output unit. Accordingly, it is not necessary to input the instruction of moving to the state in which the content data from the device that is connected to the cradle is received and outputted through the output unit by the user operation.

Preferably, the output unit is connectable with an amplifying device, and a playback state transmitting unit that transmits information regarding whether the cradle is in the portable content playback apparatus playback state or in the computer playback state to the amplifying device is further provided.

In this case, the amplifying device can cause the display device to display that the cradle is in the portable content playback apparatus playback state when the cradle is in the portable content playback apparatus playback state, and cause the display device to display that the cradle is in the computer playback state when the cradle is in the computer playback state. Accordingly, the user can learn the playback state of the cradle easily by seeing the display of the amplifying device.

Preferably, when the playback state of the cradle is changed to the portable content playback apparatus playback state or the computer playback state, or when the cradle is moved from a stand-by state to a power-on state, the playback state transmitting unit transmits the information regarding whether the cradle is in the portable content playback apparatus playback state or in the computer playback state to the amplifying device.

In this case, the amplifying device can always display the accurate playback state of the cradle in the display device.

According to a preferred embodiment of the present invention, an amplifying device that is connectable to the output unit of the cradle comprises: an input unit to which content data is inputted from the cradle; a playback state receiving unit that receives information regarding whether the cradle is in a portable content playback apparatus playback state or in a computer playback state from the cradle; and a display control unit that, based on the playback state of the cradle received by the playback state receiving unit, causes a display device to display information that the cradle is in the portable content playback apparatus playback state when the cradle is in the portable content playback apparatus playback state, and causes the display device to display information that the cradle is in the computer playback state when the cradle is in the computer playback state.

Preferably, when the amplifying device is in a stand-by state, the playback state receiving unit receives the information regarding whether the cradle is in the portable content playback apparatus playback state or in the computer playback state from the cradle and stores the information in a storage device, and when the amplifying device moves from the stand-by state to the power-on state, the display control unit causes the display device to display the information that the cradle is in the portable content playback apparatus playback state when the cradle is in the portable content playback apparatus playback state, and causes the display device to display the information that the cradle is in the computer playback state when the cradle is in the computer playback state, based on the playback state of the cradle stored in the storage device.

In this case, even if the playback state of the cradle is changed when the amplifying device is in the stand-by state, it is possible to display the accurate playback state of the cradle when the amplifying device moves from the stand-by state to the power-on state.

Another object of the present invention is to provide a cradle for a portable content playback apparatus, the cradle capable of charging the portable content playback apparatus even when the controller of the computer does not communicate with the portable content playback apparatus.

According to a preferred embodiment of the present invention, a cradle capable of supplying a supply voltage for charging a portable content playback apparatus, the portable content playback apparatus carrying out a charging operation when communicating with a controller and not carrying out the charging operation when not communicating with the controller, the cradle comprises: a first connecting unit to which the portable content playback apparatus is connectable; a second connecting unit to which a computer having a second controller is connectable; a first controller that controls the portable content playback apparatus; a first switch that switches between connection of the first connecting unit to the first controller and connection of the first connecting unit to the second connecting unit; and a switch control unit that controls switching of the first switch. When the switch control unit causes the first switch to connect the first connecting unit with the first controller, the first controller is caused to communicate with the portable content playback apparatus, and when the switch control unit causes the first switch to connect the first connecting unit with the second connecting unit, the second controller is caused to communicate with the portable content playback apparatus.

When the first switch connects the first connecting unit and the first controller, the portable content playback apparatus is not connected to the computer, but connected to the first controller within the cradle. Accordingly, the portable content playback apparatus can charge by the first controller communicating with the portable content playback apparatus. On the other hand, when the first switch connects the first connecting unit and the second connecting unit, the portable content playback apparatus is not connected to the first controller, but connected to the second controller within the computer. Accordingly, the portable content playback apparatus can charge by the second controller communicating with the portable content playback apparatus.

Preferably, the cradle further comprises an output unit that outputs content data; a hub that is connected to the second connecting unit, the first switch, and a second switch; the second switch that switches between connection of the output unit to the first controller and connection of the output unit to the hub. The first switch switches between connection of the first connecting unit to the first controller and connection of the first connecting unit to the hub; the switch control unit controls switching of the first switch and the second switch, and when the switch control unit causes the first switch to connect the first connecting unit with the hub, the second controller is caused to communicate with the portable content playback apparatus.

When the first switch connects the first connecting unit and the first controller, the portable content playback apparatus is not connected to the computer, but connected to the first controller within the cradle. Accordingly, the portable content playback apparatus can charge by the first controller communicating with the portable content playback apparatus. On the other hand, when the first switch connects the first connecting unit and the hub, the portable content playback apparatus is not connected to the first controller, but connected to the second controller within the computer. Accordingly, the portable content playback apparatus can charge by the second controller communicating with the portable content playback apparatus.

Preferably, the hub outputs a light emission control signal for controlling light emission of a light emitting device when it is detected that the portable content playback apparatus and the computer are connected the hub, the switch control unit determines whether or not the portable content playback apparatus and the computer are connected to the hub based on the light emission control signal outputted from the hub, and when it is determined to be not connected, the switch control unit causes the first switch to connect the first connecting unit with the first controller.

As the light emission control signal is utilized when the hub detects that the portable content playback apparatus and the computer are connected to the hub and notifies the switch control unit of this information, it is not necessary for the hub to additionally output a signal exclusive for notifying the switch control unit. Accordingly, it is possible to simplify the configuration of the hub.

Preferably, the light emission control signal outputted from the hub is a PWM signal, an integration circuit is further provided, the integration circuit integrating the light emission control signal to generate a control signal and supplying the generated control signal to the switch control unit, the control signal being at a first level when the portable content playback apparatus and the computer are connected to the hub and at a second level when at least one of the portable content playback apparatus and the computer is not connected to the hub, and the switch control unit determines whether or not the portable content playback apparatus and the computer are connected to the hub based on the control signal supplied from the integration circuit.

The switch control unit is not able to determine whether or not the portable content playback apparatus and the computer are connected to the hub even if the PWM signal is inputted. Therefore, by the integration circuit integrating the PWM signal and generating a high level or low level signal, the switch control unit is able to determine whether or not the portable content playback apparatus and the computer are connected to the hub based on the high level or low level signal.

DETAILED DESCRIPTION OF THE PREFERRED EMBODIMENTS

Figure 1:
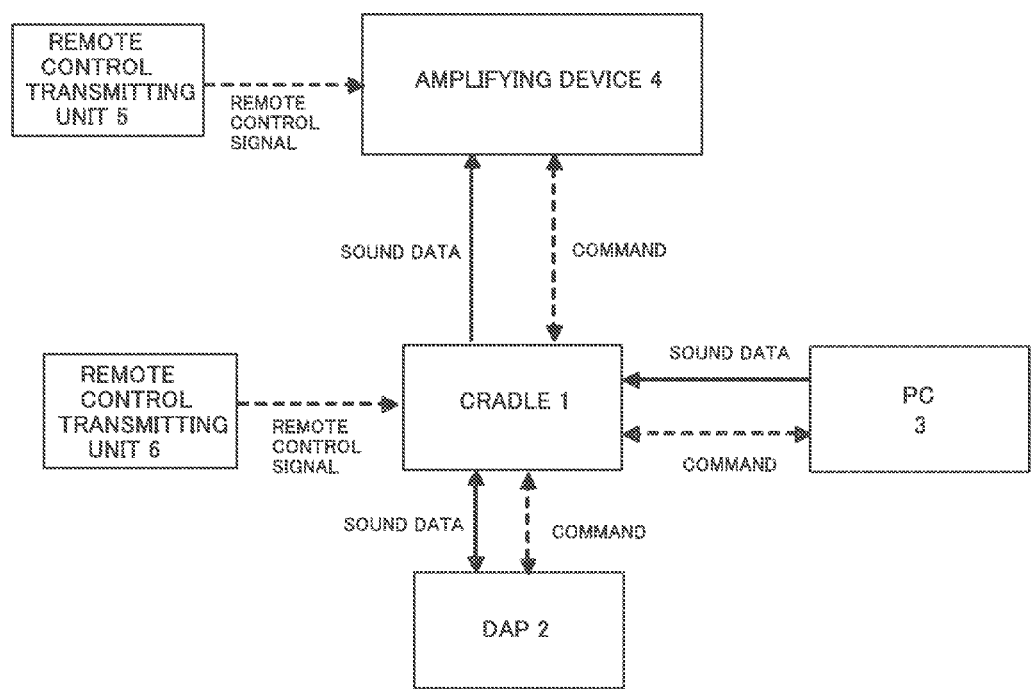
FIG. 1 is a block diagram illustrating a cradle 1 and such according to the present invention.

The following specifically describes preferred embodiments according to the present invention with reference to the drawing, but the present invention is not limited to these embodiments. FIG. 1 is a diagram illustrating a cradle 1, a portable content playback apparatus (hereinafter referred to as the digital audio player (DAP)) 2, a computer (hereinafter referred to as the PC) 3, an amplifying device 4, and remote control transmitting units 5, 6 according to this embodiment. To the cradle 1, the DAP 2 and the PC 3 can be connected via an arbitrary communication line such as the USB (Universal Serial Bus). Further, such as the IEEE1394 and the HDMI can also be adopted instead of the USB. The cradle 1 can be connected to the amplifying device 4 via a digital audio cable or a control signal cable.

The cradle 1 causes a battery of the DAP 2 to be charged by supplying a direct-current power supply voltage to the DAP 2. The DAP 2 charges the battery when communicating with a host controller (for example, when receiving a charging command from the host controller at a predetermined time interval via the USB), and does not charge the battery when not communicating with the host controller (for example, when not receiving the charging command from the host controller via the USB). Therefore, in order to continuously charge the DAP 2, the cradle 1 is required to transmit the charging command to the DAP 2 at a predetermined time interval from the host controller.

The DAP 2 or the PC 3 plays (decodes) an audio file recorded in a recording medium such as an HDD or a flash memory, and transmits audio data to the cradle 1 via the USB. The cradle 1 transmits the audio data received from the DAP 2 or the PC 3 to the amplifying device 4. The amplifying device 4 plays (carries out DA conversion or amplifies) the audio data received from the cradle 1, and outputs sound from an externally connected loudspeaker that is not shown in the drawing. The PC 3 transfers the audio file recorded in its own HDD to the cradle 1, the cradle 1 transfers the audio file from the PC 3 to the DAP 2, and the DAP 2 records the transferred audio file in its own HDD (this process is often referred to as synchronization).

When a remote control signal is received from the remote control transmitting unit 5 in response to a user operation, the amplifying device 4 transmits a control signal to the cradle 1 (the control signal for causing the DAP 2 to start playing, for example). When the control signal is received from the amplifying device 4, the cradle 1 converts the received signal to a control signal for controlling the DAP 2, and transmits the converted signal to the DAP 2, thereby controlling the DAP 2. When a remote control signal is received from the remote control transmitting unit 6 in response to a user operation, or when an operation unit provided for the cradle 1 is operated, the cradle 1 transmits the control signal to the DAP 2, thereby controlling the DAP 2.

Figure 2:
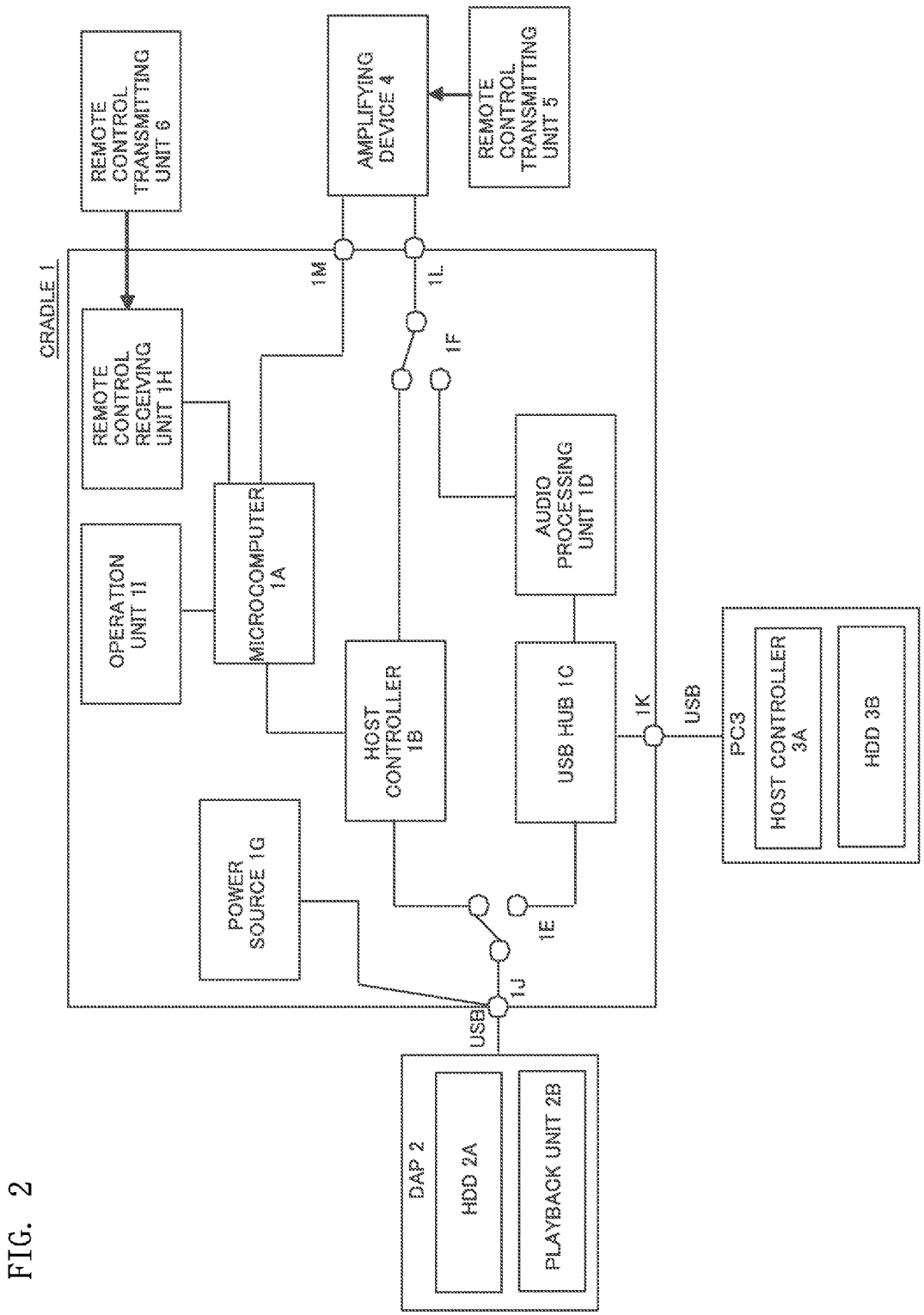
FIG. 2 is a block diagram illustrating a hardware configuration of the cradle 1 and such.
Figure 3:
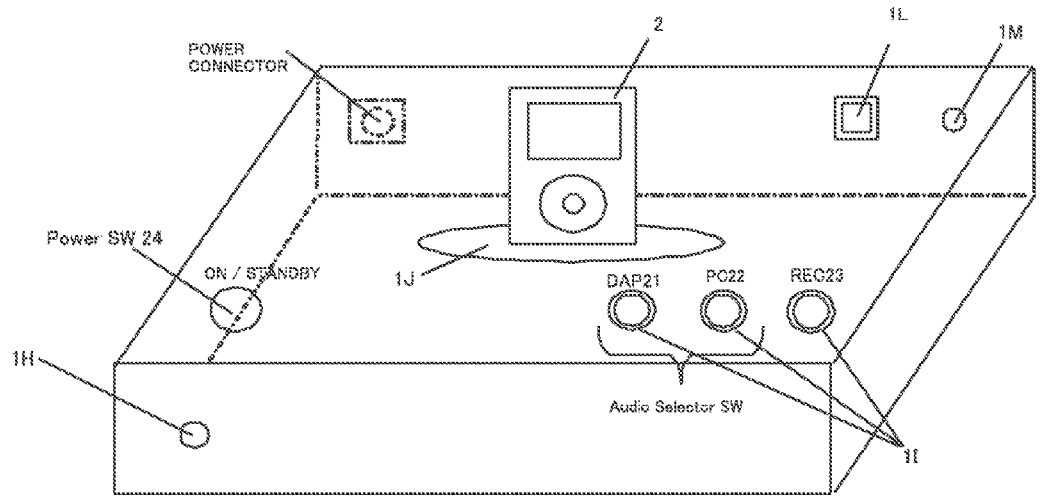
FIG. 3 is an external view of the cradle 1.

FIG. 2 is a schematic block diagram illustrating a hardware configuration of the cradle 1 and such. FIG. 3 is an external view of the cradle 1. The cradle 1 is provided with a microcomputer (switch controlling unit) 1A, a host controller 1B, a USB hub (herein after referred to as the hub) 1C, an audio processing unit 1D, switches 1E, 1F, a power source 1G, a remote control receiving unit 1H, an operation unit 1I, a connector (first connecting unit) 1J, a USB terminal (second connecting unit) 1K, a digital audio output terminal (herein after referred to as the output terminal) 1L, and a control signal input-output terminal 1M.

The microcomputer 1A controls the cradle 1 as a whole based on a program stored in a memory that is not shown in the drawing. The microcomputer 1A controls switching of the switches 1E, 1F according to a user operation of the operation unit 1I, a remote control signal inputted to the remote control receiving unit 1H, a control signal received from the amplifying device 4, and a connection state of the DAP 2 and the PC 3. The microcomputer 1A is supplied with VBUS (direct voltage of 5 V) via the USB from the PC 3. The microcomputer 1A determines whether or not the VBUS is being supplied. If the VBUS is being supplied, the PC 3 is connected to the USB terminal 1K, and it is determined that the PC 3 is in a power-on state. If the VBUS is not being supplied, the PC 3 is not connected to the USB terminal 1K, or it is determined that the PC 3 is in a power-off state.

The microcomputer 1A is supplied with a connection detection signal via the connector 1J from the DAP 2. For example, it is determined that the DAP 2 is connected to the connector 1J if the connection detection signal is low, and it is determined that the DAP 2 is not connected to the connector 1J if the connection detection signal is high.

The host controller 1B communicates with the DAP 2 via the USB and controls the DAP 2. The host controller 1B transmits a charging command to the DAP 2 at a predetermined time interval, and causes the DAP 2 to charge the battery. Accordingly, when a host controller 3A of the PC 3 is not able to transmits a charging command to the DAP due to reasons such that the PC 3 is not connected to the USB terminal 1K, the PC 3 is in the power-off state, or the switch 1E connects the connector 1J with the host controller 1B in order to transmits the audio data from the DAP 2 to the amplifying device 4, it is possible to charge the DAP 2 by the host controller 1B transmitting the charging command to the DAP 2.

The host controller 1B is connected to the switches 1E, 1F and to the microcomputer 1A. The host controller 1B transmits a control signal from the microcomputer 1A to the DAP 2, and controls the DAP 2. The host controller 1B receives the audio data from the DAP 2, and supplies the data to the switch 1F.

The hub 1C connects the DAP 2 and the audio processing unit 1D as slaves (downstream side) to the PC 3 as a host (upstream side) in parallel via the USB. Specifically, the hub 1C connects the connector 1J on the downstream side to which the DAP 2 is connectable via the USB and the audio processing unit 1D as a USB device on the downstream side to the USB terminal 1K on the upstream side to which the PC 3 is connectable via the USB within the cradle 1. The hub 1C is connected to the switch 1E, the USB terminal 1K, and the audio processing unit 1D.

As a general function, the hub 1C is connected with USB devices on its host side and slave side, and detects whether or not a USB device as the host and a USB device as the slave are allowed to communicate with each other. Specifically, the hub 1C is connected with the DAP 2 as the slave and the PC 3 in the power-on state as the host side, and detects whether or not the host controller 3A of the PC 3 is allowed to communicate with the DAP 2. After detecting that the DAP 2 and the PC 3 in the power-on state are connected, the hub 1C controls emission of a light emitting device (hereinafter referred to as the LED) (for example, causes the LED to emit light), and notifies the user of this control. On the other hand, after detecting that the DAP 2 and/or the PC 3 are not connected, the hub 1C prevents the LED from emitting light.

Figure 4:
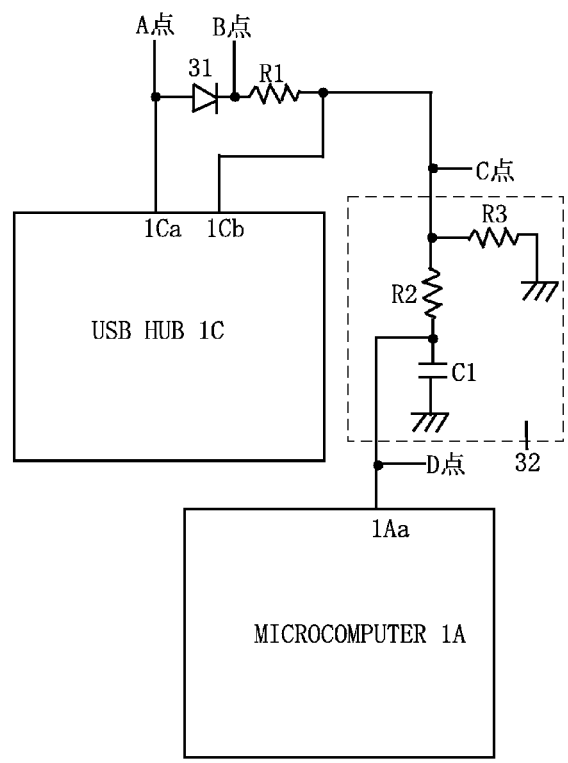
FIG. 4 is a circuit diagram of a microcomputer 1A, a hub 1C, and an integration circuit.
Figure 5:
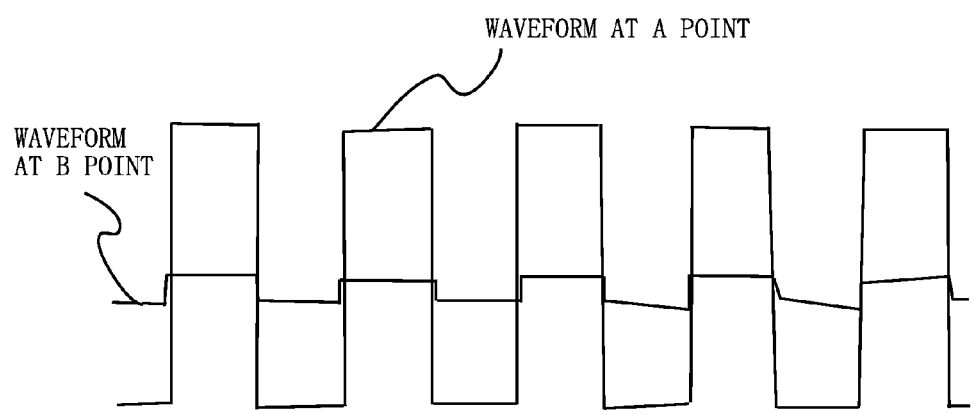
FIG. 5 shows a waveform at an A point and a waveform at a B point in FIG. 4.
Figure 6:
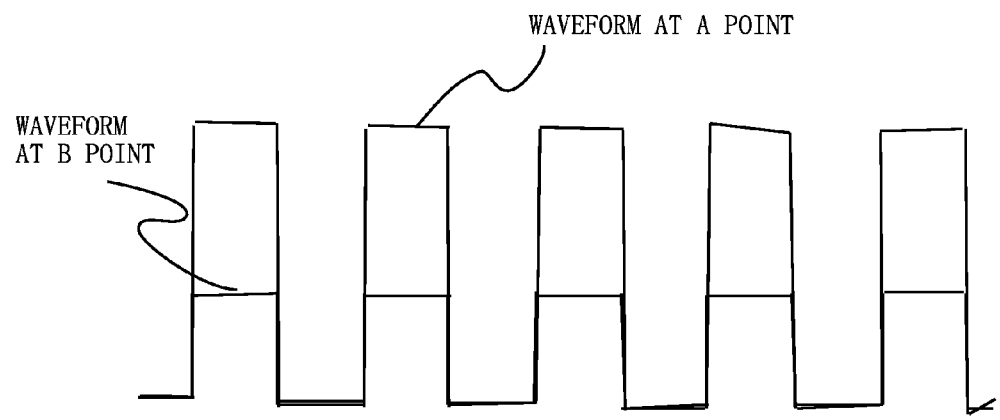
FIG. 6 shows a waveform at the A point and a waveform at the B point in FIG. 4.

Specifically, as shown in FIG. 4, an output terminal 1Ca of the hub 1C is connected to an anode of the LED 31, and an output terminal 1Cb of the hub 1C is connected to a cathode of the LED 31 via a resistance R1. From the output terminals 1Ca and 1Cb, PWM signals (light emission control signal) for causing the LED 31 to emit light or to stop emitting light are outputted. FIG. 5 shows waveforms at an A point and a B point when the DAP 2 and/or the PC 3 are not connected to the hub 1C. Referring to FIG. 5, as a potential difference between an average voltage of the A point and an average voltage of the B point is −0.1 V and the LED 31 is turned into an off state, the LED 31 does not emit light. FIG. 6 shows waveforms at the A point and the B point when the DAP 2 and the PC 3 in the power-on state are connected to the hub 1C. Referring to FIG. 6, as the potential difference between the average voltage of the A point and the average voltage of the B point is 1.08 V and the LED 31 is turned into an on state, the LED 31 emits light.

In this embodiment, the microcomputer 1A is notified of information regarding whether or not the DAP 2 and the PC 3 in the power-on state are connected to the hub 1C using the PWM signal outputted from the output terminal 1Cb of the hub 1C (the waveform at the C point). Accordingly, it is not necessary to output a signal only for notifying the microcomputer 1A of the information regarding whether or not the DAP 2 and the PC 3 in the power-on state are connected to the hub 1C additionally from the hub 1C. Therefore, a number of the output terminals the hub 1C can be reduced, and the configuration of the hub 1C can be simplified.

Specifically, as shown in FIG. 4, an integration circuit 32 is connected between the output terminal 1Cb of the hub 1C and an input terminal 1Aa of the microcomputer 1A. The integration circuit 32 includes resistances R2, R3 and a capacitor C1. One end of the resistance R2 is connected to the output terminal 1Cb, and connected to a ground potential via the resistance R3. The other end of the resistance R2 is connected to the ground potential via the capacitor C1, and connected to the input terminal 1Aa of the microcomputer 1A. The PWM signal outputted from the output terminal 1Cb is integrated by the integration circuit 32 to generate a high or low level signal, which is supplied to the input terminal 1Aa of the microcomputer 1A.

Figure 7:
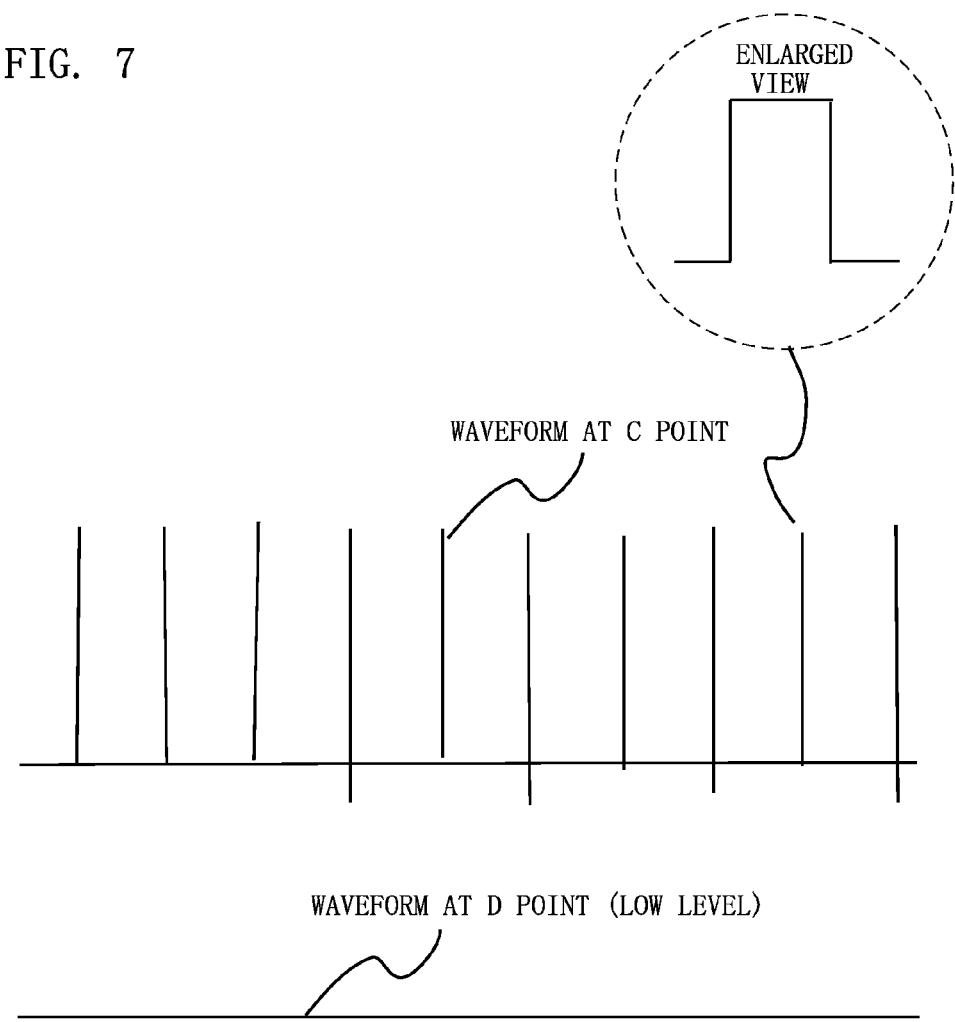
FIG. 7 shows a waveform at a C point and a waveform at a D point in FIG. 4.
Figure 8:
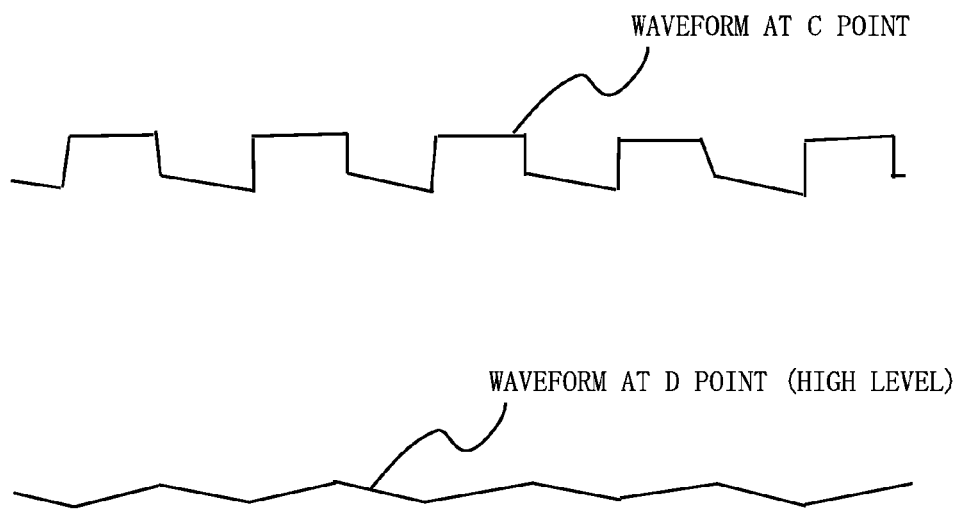
FIG. 8 shows a waveform at the C point and a waveform at the D point in FIG. 4.

The microcomputer 1A is not able to detect the PWM signal outputted from the output terminal 1Cb of the hub 1C. Therefore, the PWM signal is converted into the high or low level signal by integrating the PWM signal by the integration circuit 32, and then supplied to the microcomputer 1A. FIG. 7 shows waveforms at a C point and a D point when the DAP 2 and/or the PC 3 are not connected to the hub 1C. In this case, the microcomputer 1A is able to determine that the DAP 2 and/or the PC 3 are not connected to the hub 1C by supplying the low level signal to the microcomputer 1A. FIG. 8 shows waveforms at the C point and the D point when the DAP 2 and the PC 3 in the power-on state are connected to the hub 1C. In this case, the microcomputer 1A is able to determine that the DAP 2 and the PC 3 in the power-on state are connected to the hub 1C by supplying the high level signal to the microcomputer 1A.

When the low level signal inputted and it is determined that the DAP 2 and/or the PC 3 are not connected to the hub 1C, the microcomputer 1A causes the switch 1E to connect the connector 1J with the host controller 1B. Accordingly, when the charging command cannot be transmitted from the host controller 3A to the DAP 2 due to reasons such that the PC 3 is in the power-off state or the PC 3 is not connected, it is possible to charge the DAP 2 by connecting the host controller 1B with the DAP 2 and by transmitting the charging command from the host controller 1B to the DAP 2.

The audio processing unit 1D is a downstream device with respect to the hub 1C. The audio processing unit 1D is supplied with the audio data from the PC 3 via the hub 1C, converts the audio data into a predetermined format (SPDIF, for example), and supplies the converted data to the switch 1F. The audio processing unit 1D is configured by such as a USB audio DAC, and connected between the hub 1C and the switch 1F. As the audio processing unit 1D is always connected to the hub 1C, the PC 3 connected to the hub 1C constantly recognizes the audio processing unit 1D. Accordingly, when a state in which the audio data from the DAP 2 is outputted to the amplifying device 4 is switched to a state in which the audio data from the PC 3 is outputted to the amplifying device 4, it is not necessary for the PC 3 to again recognize the audio processing unit 1D, and it is possible to immediately output the audio data from the PC 3 to the amplifying device 4.

The switch 1E switches between a connection of the connector 1J with the host controller 1B and a connection of the connector 1J with the hub 1C based on an instruction from the microcomputer 1A. As the switch 1E, for example, such as a USB 2.0 compatible high speed bus switch can be adopted. The switch 1F switches between a connection of an output terminal 1L with the host controller 1B and a connection of the output terminal 1L with the audio processing unit 1D based on an instruction from the microcomputer 1A.

The power source 1G is supplied with commercial alternating-current power from a power connector shown in FIG. 3, generates a direct-current power supply voltage from the commercial alternating-current power, and supplies the generated voltage to the components of the cradle 1 as well as to the DAP 2 via the connector 1J. The direct-current power supply voltage supplied to the DAP 2 is used by the DAP 2 to charge the battery.

The remote control receiving unit 1H receives a remote control signal from the remote control transmitting unit 6 for the cradle 1, and supplies the control signal to the microcomputer 1A.

The operation unit 1I accepts an instruction based on the user operation. The operation unit 1I includes a DAP button 21 and a PC button 22 as audio selector switches, a record button 23, and a power button 24. The DAP button 21 is a button for switching to a state in which the cradle 1 receives the audio data from the DAP 2 and outputs the audio data to the amplifying device 4 (hereinafter referred to as the DAP playback state). The PC button 22 is a button for switching to a state in which the cradle 1 receives the audio data from the PC 3 and outputs the audio data to the amplifying device 4 (hereinafter referred to as the PC playback state). The record button 23 is a button for switching to a state in which the cradle 1 transfers the audio data from the PC 3 to the DAP 2 and causes the DAP 2 to record the audio file (hereinafter referred to as the recording state). The record button 23 also cancels the recording state. The power button 24 is a button for switching the cradle 1 to a power-on state or a stand-by state. These buttons are also provided for the remote control transmitting unit 6.

The connector 1J is connectable to a connector of the DAP 2. The connector 1J includes USB terminals (terminals for the datalines D+ and D−, and 5-V power line) and terminals for receiving the connection detection signal from the DAP 2. The connector 1J is connected to the microcomputer 1A, the switch 1E, and the power source 1G.

The USB terminal 1K is connectable with the PC 3 via the USB. The USB terminal 1K is connected to the hub 1C. The output terminal 1L is connected to the switch 1F, and is connectable with a digital audio input terminal of the amplifying device 4. The output terminal 1L outputs the audio data supplied from the switch 1F to the amplifying device 4.

The control signal input-output terminal 1M is connected to the microcomputer 1A, and is connectable to the amplifying device 4 via a control signal line. Upon reception of the remote control signal from the remote control transmitting unit 5 for the amplifying device 4, the amplifying device 4 transmits the control signal to the control signal input-output terminal 1M. The control signal input-output terminal 1M receives the control signal from the amplifying device 4, and supplies the signal to the microcomputer 1A. For example, when the control signal for causing the DAP 2 to start playing is inputted to the control signal input-output terminal 1M from the amplifying device 4, the microcomputer 1A transmits a playback instruction to the DAP 2 and switches to the DAP playback state.

The microcomputer 1A transmits the control signal to the amplifying device 4 via the control signal input-output terminal 1M. For example, the microcomputer 1A transmits information regarding whether the cradle 1 is in the DAP playback state or in the PC playback state to the amplifying device 4 via the control signal input-output terminal 1M, in order to display whether the cradle 1 is in the DAP playback state or in the PC playback state in a display unit of the amplifying device 4.

The DAP 2 is provided with such as an HDD 2A and a playback unit 2B. The playback unit 2B plays the audio file recorded in the HDD, and outputs audio data to the cradle 1. The PC 3 provided with such as the host controller 3A and an HDD 3B. Common devices may be adopted as the DAP 2 and the PC 3.

Figure 2B:
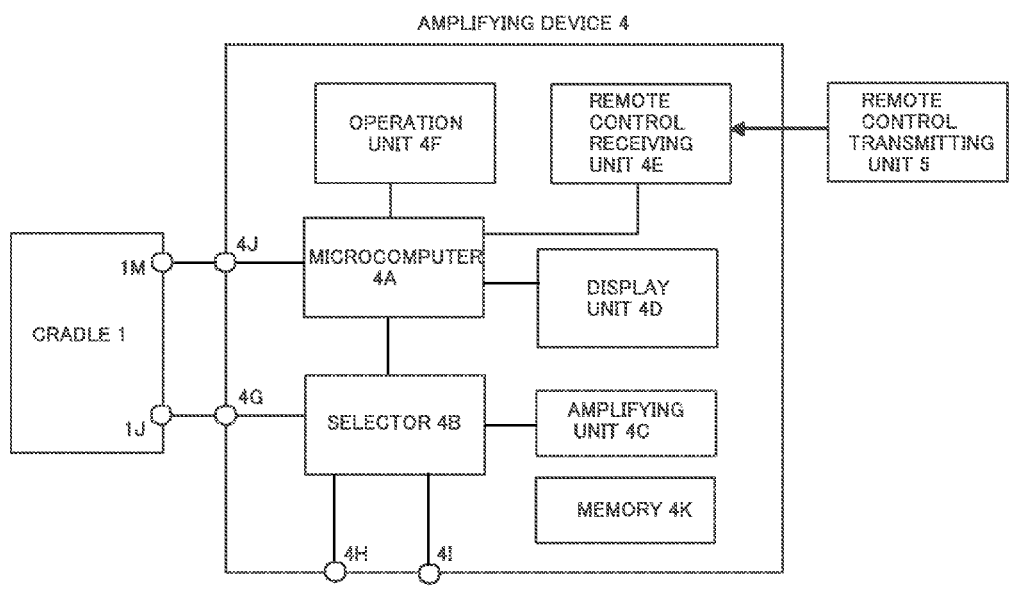
FIG. 2B is a block diagram illustrating a hardware configuration of an amplifying device 4.

FIG. 2B is a block diagram illustrating the amplifying device 4. The amplifying device 4 is provided with a microcomputer 4A, a selector 4B, an amplifying unit 4C, a display unit 4D, a remote control receiving unit 4E, an operation unit 4F, digital audio input terminals (hereinafter referred to as the input terminals) 4G-4I (the input terminals 4H, 4I can be analog audio input terminals), a control signal input-output terminal 4J, and a memory (such as a ROM or a RAM) 4K. The input terminal 4G is connected with the output terminal 1J of the cradle 1, receives the audio data from the cradle 1, and supplies the data to the selector 4B. The input terminals 4H, 4I are connectable with arbitrary source devices (such as a CD player and an MD player, for example).

The microcomputer 4A operates based on a program stored in the memory 4K, and controls the components of the amplifying device 4 based on instructions inputted by the user operation via the remote control receiving unit 4E or the operation unit 4F. The microcomputer 4A transmits a control signal to the microcomputer 1A of the cradle 1 via the control signal input-output terminal 4J. For example, when a DAP playback instruction is inputted from a remote control operation by the user, the microcomputer 4A transmits the DAP playback instruction to the microcomputer 1A of the cradle 1 via the control signal input-output terminal 4J. The microcomputer 4A inputs a control signal from the microcomputer 1A of the cradle 1 via the control signal input-output terminal 4J.

Figure 2C:
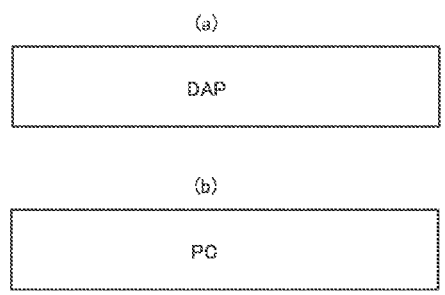
FIG. 2C is a diagram illustrating a display in a display unit 4D.

The selector 4B selects one of the input terminals 4G-4I in response to an instruction from the microcomputer 4A, and supplies audio data inputted from the selected input terminal to the amplifying unit 4C. Selection states of the selector 4B include such as a DAP/PC selection state in which the input terminal 4G is selected, a CD selection state in which the input terminal 4H is selected, and an MD selection state in which the input terminal 4I is selected. The microcomputer 4A displays "CD" in the display unit 4D when the selector 4B is in the CD selection state, and "MD" in the display unit 4D when the selector 4B is in the MD selection state. The microcomputer 4A acquires the information regarding whether the cradle 1 is in the DAP playback state or in the PC playback state from the microcomputer 1A of the cradle 1 via the control signal input-output terminal 4J. When the selector 4B is in the DAP/PC selection state, the microcomputer 4A displays "DAP" in the display unit 4D as shown in FIG. 2C (a) if the cradle 1 is in the DAP playback state, and displays "PC" in the display unit 4D as shown in FIG. 2C(b) if the cradle 1 is in the PC playback state. Accordingly, the user can learn whether the amplifying device 4 plays the audio data from the DAP 2 or the audio data from the PC 3 by seeing the display in the display unit 4D.

The amplifying unit 4C carries out digital-analog conversion of the audio data supplied from the selector 4B, amplifies the audio data, and outputs the sound to the externally connected loudspeaker.

Figure 9:
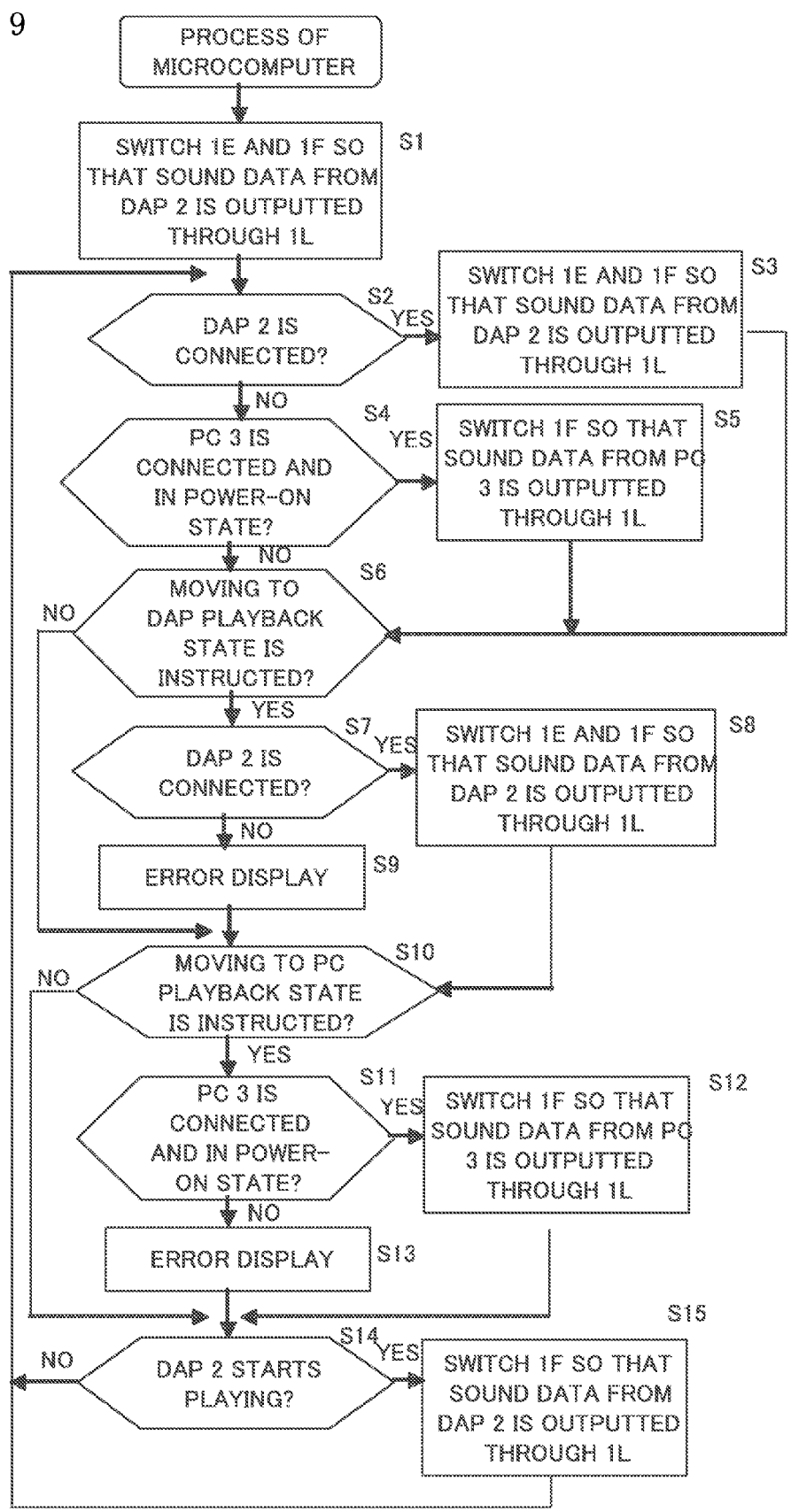
FIG. 9 is a flow chart showing a process of the microcomputer 1A.

The following describes an operation of the cradle 1. FIG. 9 shows an operation of the microcomputer 1A switching between the DAP playback state and the PC playback state. The microcomputer 1A, as an initial state of the switches 1E, 1F, causes the switch 1E to connect the connector 1J with the host controller 1B, and causes the switch 1F to connect the host controller 1B with the output terminal 1L. In other words, the microcomputer 1A sets the initial state to the DAP playback state. Accordingly, it is possible to output the audio data from the DAP 2 to the amplifying device 4 via the switch 1E, the host controller 1B, and the switch 1F. As the connector 1J is connected with the host controller 1B by the switch 1E, even when the PC 3 is not connected or in the power-off state, the charging command is transmitted from the host controller 1B to the DAP 2, and the DAP 2 can be charged. It should be noted that the microcomputer 1A notifies the microcomputer 4A of the amplifying device 4 of information that the cradle is in the DAP playback state.

In S2 to S5, the microcomputer 1A switches the switches 1E, 1F according to the state of connection of the DAP 2 and the PC 3 to the cradle 1. The microcomputer 1A determines whether or not the connection detection signal is supplied to the connector 1J from the DAP 2, thereby determining whether or not the DAP 2 is connected to the connector 1J (S2). If the DAP 2 is connected (YES in S2), the microcomputer 1A causes the switch 1E to connect the connector 1J with the host controller 1B, and causes the switch 1F to connect the host controller 1B with the output terminal 1L. In other words, the microcomputer 1A sets to the DAP playback state (S3). Accordingly, the audio data from the DAP 2 is outputted to the amplifying device 4 via the switch 1E, the host controller 1B, and the switch 1F. Then, the process proceeds to S6. In this case, the charging command is transmitted from the host controller 1B to the DAP 2, and the DAP 2 can be charged. It should be noted that, the microcomputer 1A notifies the microcomputer 4A of the amplifying device 4 of the information that the cradle is in the DAP playback state.

If the DAP 2 is not connected (NO in S2), the microcomputer 1A determines whether or not the VBUS is supplied from the PC 3, thereby determining whether the PC 3 is connected to the USB terminal 1K and the PC 3 is in the power-on state (S4). If the PC is connected and is in the power-on state (YES in S4), the microcomputer 1A causes the switch 1E to connect the connector 1J with the host controller 1B, and causes the switch 1F to connect the audio processing unit 1D with the output terminal 1L. In other words, the microcomputer 1A sets to the PC playback state (S5). It should be noted that the microcomputer 1A notifies the microcomputer 4A of the amplifying device 4 of information that the cradle is in the PC playback state. Accordingly, the audio data from the PC 3 is outputted to the amplifying device 4 via the hub 1C, the audio processing unit 1D, and the switch 1F. Then, the process proceeds to S6. In this case, the charging command is transmitted from the host controller 1B to the DAP 2, and the DAP 2 can be charged. Alternatively, it is possible to charge the DAP 2 by causing the switch 1E to connect the connector 1J with the hub 1C and by transmitting the charging command to the DAP 2 from the host controller 3A of the PC 3. On the other hand, if the PC 3 is not connected or the PC 3 is in the power-off state (NO in S4), the process proceeds to S6 without switching between the switches 1E, 1F (in the initial state).

In S6 to S13, the microcomputer 1A switches the switches 1E, 1F according to an instruction of moving to the DAP playback state and an instruction of moving to the PC playback state. The microcomputer 1A determines whether or not the instruction of moving to the DAP playback state is inputted (S6). For example, it is determined whether or not the DAP button 21 is operated, or whether or not the instruction of moving to the DAP playback state is inputted from the microcomputer 4A of the amplifying device 4. If the instruction of moving to the DAP playback state is not inputted (NO in S6), the process proceeds to S10. If the instruction of moving to the DAP playback state is inputted (YES in SS6), the microcomputer 1A determines whether or not the DAP 2 is connected to the connector 1J in the similar manner described above (S7). If the DAP 2 is connected (YES in S7), the microcomputer 1A causes the switch 1E to connect the connector 1J with the host controller 1B, and causes the switch 1F to connect the host controller 1B with the output terminal 1L. In other words, the microcomputer 1A sets to the DAP playback state (S8). It should be noted that the microcomputer 1A notifies the microcomputer 4A of the amplifying device 4 of the information that the cradle is in the DAP playback state. Accordingly, the audio data from the DAP 2 is outputted to the amplifying device 4 via the switch 1E, the host controller 1B, and the switch 1F. Then, the process proceeds to S10. In this case, the charging command is transmitted from the host controller 1B to the DAP 2, and the DAP 2 can be charged. On the other hand, if the DAP 2 is not connected (NO in S7), the microcomputer 1A does not switch the switches 1E, 1F, and notifies the user of an error by causing the LED that is not shown in the drawing to blink (S9). For example, in a case in which the instruction of moving to the DAP playback state is inputted by the user's erroneous operation when the DAP is not connected in the PC playback state, moving to the DAP playback state stops the playback of the audio data from the PC 3. However, it is possible to solve such a problem according to this embodiment.

The microcomputer 1A determines whether or not the instruction of moving to the PC playback state is inputted (S10). For example, it is determined whether or not the PC button 22 is operated, or whether or not the instruction of moving to the PC playback state is inputted from the microcomputer 4A of the amplifying device 4. If the instruction of moving to the PC playback state is not inputted (NO in S10), the process proceeds to S14. If the instruction of moving to the PC playback state is inputted (YES in S10), the microcomputer 1A determines whether or not the PC 3 is connected to the USB terminal 1K and in the power-on state, in the similar manner as described above (S11). If the PC 3 is connected and is in the power-on state (YES in S11), the microcomputer 1A causes the switch 1E to connect the connector 1J with the host controller 1B, and causes the switch 1F to connect the audio processing unit 1D with the output terminal 1L. In other words, the microcomputer 1A sets to the PC playback state (S12). It should be noted that the microcomputer 1A notifies the microcomputer 4A of the amplifying device 4 of the information that the cradle is in the PC playback state. Accordingly, the audio data from the PC 3 is outputted to the amplifying device 4 via the hub 1C, the audio processing unit 1D, and the switch 1F. Then, the process proceeds to S14. In this case, the charging command is transmitted from the host controller 1B to the DAP 2, and the DAP 2 can be charged. Alternatively, it is possible to charge the DAP 2 by causing the switch 1E to connect the connector 1J with the hub 1C and by transmitting the charging command to the DAP 2 from the host controller 3A of the PC 3. On the other hand, if the PC 3 is not connected or the PC 3 is in the power-off state (NO in S11), the microcomputer 1A does not switch the switches 1E, 1F, and notifies the user of an error by causing the LED that is not shown in the drawing to blink (S13). For example, in a case in which the instruction of moving to the PC playback state is inputted by the user's erroneous operation when the PC 3 is not connected in the DAP playback state, moving to the PC playback state stops the playback of the audio data from the DAP 2. However, it is possible to solve such a problem according to this embodiment.

Next, the microcomputer 1A determines whether or not the DAP 2 has started playing the audio data based on a playback start notification from the DAP 2 (S14). When the switch 1E connects the connector 1J with the host controller 1B, the host controller 1B is able to receive the playback start notification if the DAP 2 starts playing, and this notification is transferred to the microcomputer 1A. When the DAP 2 has started playing (YES in S14), the microcomputer 1A causes the switch 1F to connect the host controller 1B with the output terminal 1L. In other words, the microcomputer 1A sets to the DAP playback state (S15). It should be noted that the microcomputer 1A notifies the microcomputer 4A of the amplifying device 4 of the information that the cradle is in the DAP playback state. Accordingly, the audio data from the DAP 2 is outputted to the amplifying device 4 via the switch 1E, the host controller 1B, and the switch 1F. Then, the process returns to S2. In this case, the charging command is transmitted from the host controller 1B to the DAP 2, and the DAP 2 can be charged.

According to the above processes, it is possible to switch between the DAP playback state and the PC playback state without connecting or disconnecting the cradle 1, the DAP 2, the PC 3, and the amplifying device 4 by the user operation. It should be noted that the instruction of moving to the DAP playback state in S6 and the instruction of moving to the PC playback state in S10 are not limited to the button operations, and can be remote control signals from the remote control transmitting unit 6 or control signals supplied from the amplifying device 4.

Figure 9B:
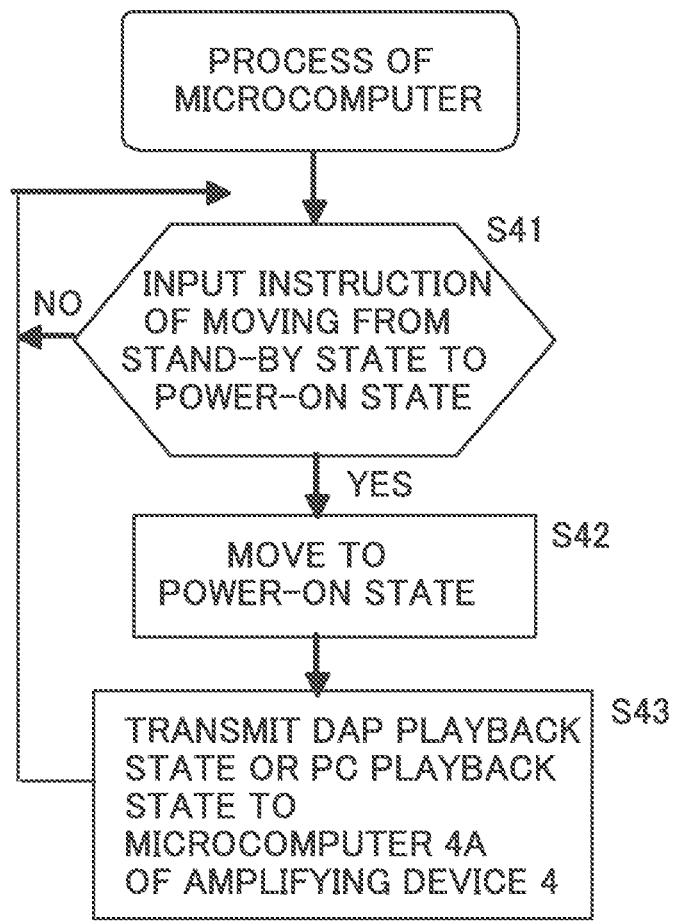
FIG. 9B is a flow chart showing a process of the microcomputer 1A.

FIG. 9B is a flow chart showing the operation of the microcomputer 1A when the cradle 1 moves from the stand-by state to the power-on state. The microcomputer 1A determines whether or not an instruction of moving from the stand-by state to the power-on state has been inputted (S41). For example, when the cradle 1 is in the stand-by state, it is determined whether or not the power button 24 is operated or whether or not the instruction of moving from the stand-by state to the power-on state is received from the microcomputer 4A of the amplifying device 4. When an instruction of turning power on is inputted (YES in S41), the microcomputer 1A moves the state of the cradle 1 from the stand-by state to the power-on state (S42). Then, the microcomputer 1A transmits the information regarding whether the cradle 1 is in the DAP playback state or in the PC playback state to the microcomputer 4A of the amplifying device 4 (S43). At this time, as the cradle 1 in the stand-by state also saves the information regarding whether the cradle 1 is in the DAP playback state or in the PC playback state in the memory that is not shown in the drawing, when moving from the stand-by state to the power-on state, the cradle 1 resumes to the DAP playback state or the PC playback state that is saved in the memory, and transmits the information regarding whether the cradle 1 is in the DAP playback state or in the PC playback state to the microcomputer 4A of the amplifying device 4.

Figure 9C:
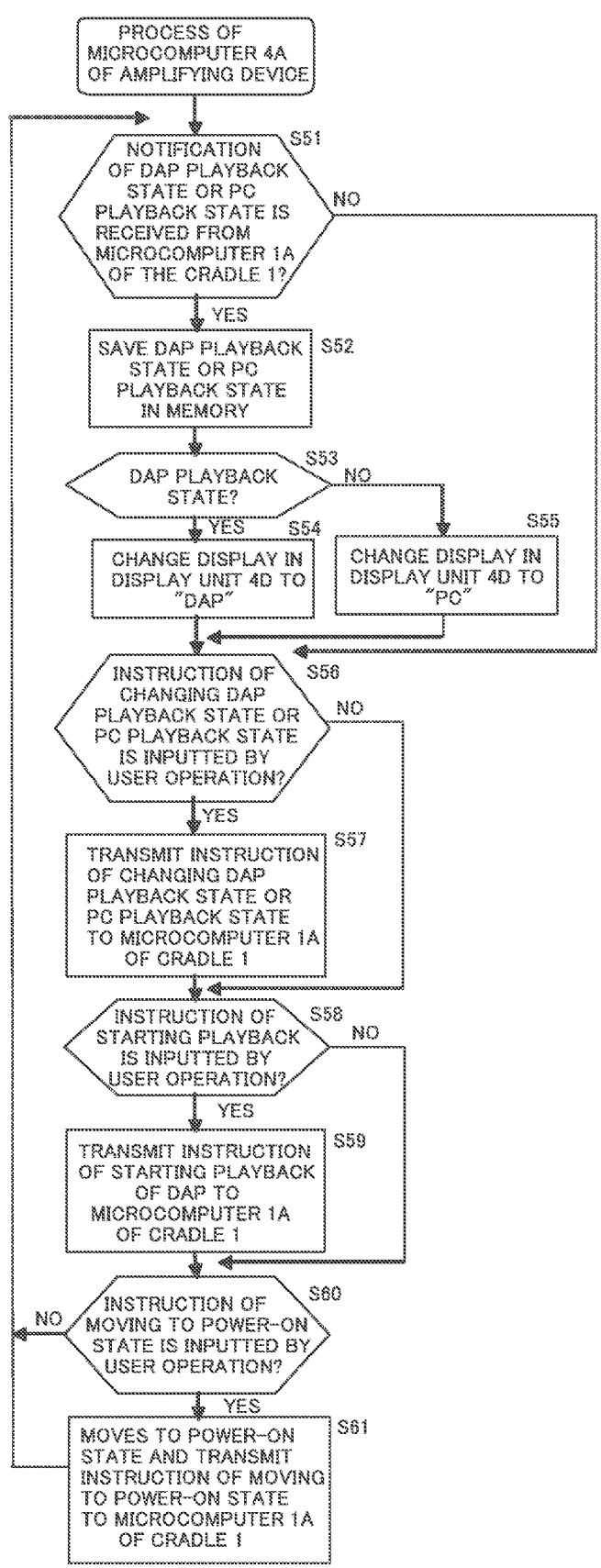
FIG. 9C is a flow chart showing a process of the microcomputer 4A.

FIG. 9C is a flow chart showing a process of the microcomputer 4A of the amplifying device 4. The microcomputer 4A determines whether the information regarding whether the cradle 1 is in the DAP playback state or in the PC playback state has been received from the microcomputer 1A of the cradle 1 (S51). If the information has not been received (NO in S51), the process proceeds to S56. If the information has been received (YES in S51), the microcomputer 4A saves the information regarding whether the cradle 1 is in the DAP playback state or in the PC playback state in the memory 4K (S52).

The microcomputer 4A determines whether or not the state saved in the memory is the DAP playback state (S53). If the state is the DAP playback state (YES in S53), the microcomputer 4A displays "DAP" in the display unit 4D as shown in FIG. 2C (a) when the selector 4B is in the DAP/PC selection state (S54). On the other hand, if the state is the PC playback state (NO in S53), the microcomputer 4A displays "PC" in the display unit 4D as shown in FIG. 2C (b) when the selector 4B is in the DAP/PC selection state (S55).

It should be noted that the processes in S51 and S52 are carried out when the amplifying device 4 is in the stand-by state. In the stand-by state, a supply voltage is supplied from a stand-by power circuit that is not shown in the drawing only to the microcomputer 4A, and the operation can be carried out. Accordingly, if the selector 4B is in the DAP/PC selection state when the amplifying device 4 moves from the stand-by state to the power-on state, "DAP" is displayed in the display unit 4D in the DAP playback state and "PC" is displayed in the display unit 4D in the PC playback state, based on the information regarding whether the cradle 1 is in the DAP playback state or in the PC playback state saved in the memory 4K. Therefore, when the playback state of the cradle is changed while the amplifying device 4 is in the stand-by state, the playback state of the cradle saved in the memory 4K is changed accordingly to a correct state. As a result, it is possible to display the correct playback state of the cradle 1 when the amplifying device 4 is moved to the power-on state.

The microcomputer 4A determines whether or not the instruction of moving the cradle 1 to the DAP playback state or PC playback state has been inputted by the user operation via the remote control receiving unit 4E or the operation unit 4F (S56). If the instruction has not been inputted (NO in S56), the process proceeds to S58. If the instruction has been inputted (YES in S56), the microcomputer 4A transmits the instruction of moving the cradle 1 to the DAP playback state or the PC playback state to the microcomputer 1A of the cradle 1 (S57). It should be noted that the microcomputer 4A does not change, at this timing, the information regarding whether the cradle 1 is in the DAP playback state or in the PC playback state that is saved in the memory. The information regarding whether the cradle 1 is in the DAP playback state or in the PC playback state saved in the memory is changed only when the information regarding whether the cradle 1 is in the DAP playback state or in the PC playback state is actually received from the microcomputer 1A of the cradle 1 in S51. With this, it is possible to realize better synchronization between the actual playback state of the cradle 1 and the playback state of the cradle 1 saved in the memory of the amplifying device.

The microcomputer 4A determines whether or not the instruction of starting playback of the DAP has been inputted by the user operation via the remote control receiving unit 4E or the operation unit 4F (S58). If the instruction has not been inputted (NO in S58), the process proceeds to S60. If the instruction has been inputted (YES in S58), the microcomputer 4A transmits the instruction of starting playback of the DAP to the microcomputer 1A of the cradle 1 (S59). It should be noted that the microcomputer 4A does not change, at this timing, the playback state of the cradle 1 saved in the memory to DAP playback state. The playback state of the cradle 1 saved in the memory is changed to the DAP playback state only when the information indicating that the cradle 1 is in the DAP playback state is actually received in S51. With this, it is possible to realize better synchronization between the actual playback state of the cradle 1 and the playback state of the cradle 1 saved in the memory of the amplifying device.

The microcomputer 4A determines whether or not the instruction of moving to the power-on state has been inputted by the user operation via the remote control receiving unit 4E or the operation unit 4F (S60). If the instruction has not been inputted (NO in S60), the process returns to S51. If the instruction has been inputted (YES in S60), the microcomputer 4A moves the amplifying device 4 from the stand-by state to the power-on state, and transmits the instruction of moving from the stand-by state to the power-on state to the microcomputer 1A of the cradle 1 (S61). As the information regarding whether the cradle 1 is in the DAP playback state or in the PC playback state is received from the microcomputer 1A of the cradle 1 after the cradle 1 has moved from the stand-by state to the power-on state, it is possible to display the correct playback state of the cradle 1. For example, the playback states can be synchronized when the DAP playback state or the PC playback state of the cradle 1 is changed in a case in which the amplifying device 4 is in the stand-by state, in which the cradle 1 is in the power-on state, and in which a communication cable is plugged off from the amplifying device 4 and the cradle 1, when the cradle 1 is then set to the stand-by state, when subsequently the amplifying device 4 and the cradle 1 are connected by the communication cable, and when the amplifying device 4 and the cradle 1 are set in the power-on state.

Figure 10:
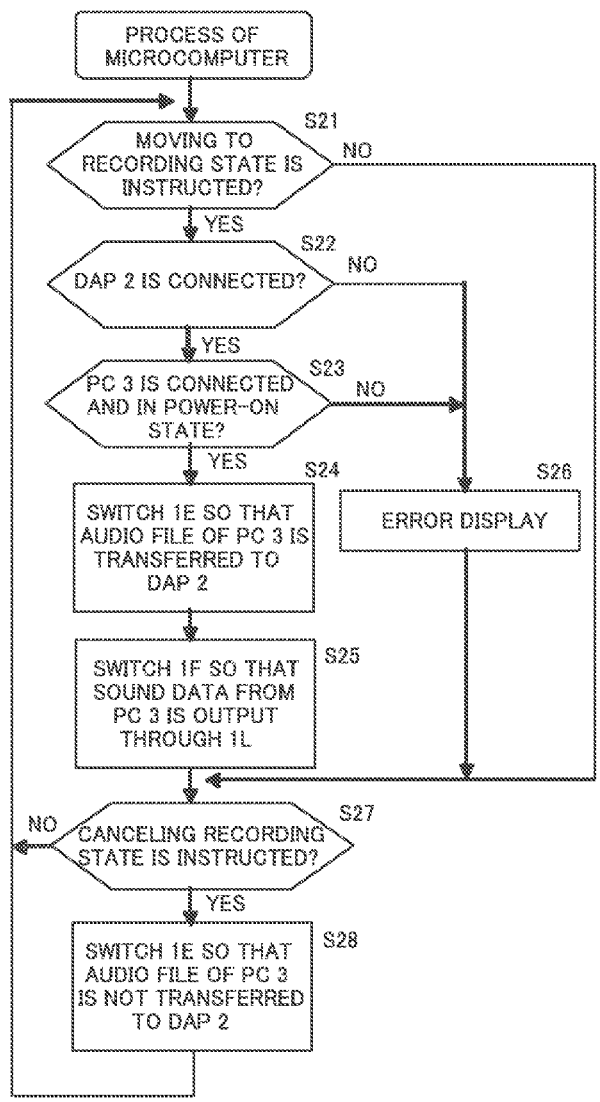
FIG. 10 is a flow chart showing a process of the microcomputer 1A.

FIG. 10 shows an operation of the microcomputer 1A of moving to or canceling the recording state. It is possible to move to the recording state either in the DAP playback state or in the PC playback state. The microcomputer 1A determines whether or not the instruction of moving to the recording state has been inputted (S21). For example, it is determined whether or not the record button 23 has been pressed for a short time. If the instruction of moving to the recording state has not been inputted (NO in S21), the process returns to S27. If the instruction of moving to the recording state has been inputted (YES in S21), the microcomputer 1A determines whether or not the DAP 2 is connected to the connector 1J, in the similar manner as described above (S22). If the DAP 2 is not connected (NO in S22), the microcomputer 1A notifies the user of the error without causing the switch 1E to connect the connector 1J with the hub 1C (S26). In other words, the state does not moves to the recording state. If the DAP 2 is connected (YES in S22), the microcomputer 1A determines whether or not the PC 3 is connected to the USB terminal 1K and the PC 3 is in the power-on state, in the similar manner as described above (S23). If the PC 3 is not connected or is in the power-off state (NO in S23), the microcomputer 1A notifies the user of the error without causing the switch 1E to connect the connector 1J with the hub 1C (S26). In other words, the state does not move to the recording state. If the switch 1E connects the connector 1J with the hub 1C when the PC 3 is not connected or in the power-off state, it is not possible to transmit the charging command to the DAP 2 and the DAP 2 cannot be charged. However, it is possible to solve such a problem according to this embodiment.

If the PC 3 is connected and is in the power-on state (YES in S23), the microcomputer 1A causes the switch 1E to connect the connector 1J with the hub 1C. In other words, the microcomputer 1A sets to the recording state (S24). Accordingly, by the DAP 2 and the PC 3 communicating with each other via the USB, the audio file from the PC 3 is transferred to the DAP 2 via the hub 1C and the switch 1E, and recorded in the DAP 2. In this case, the charging command cannot be transmitted from the host controller 1B to the DAP 2, but the DAP 2 can be charged by transmitting the charging command from the host controller 3A of the PC 3 to the DAP 2.

The microcomputer 1A causes the switch 1F to connect the audio processing unit 1D with the output terminal 1L. In other words, the microcomputer 1A sets to the PC playback state (S25). Accordingly, the audio file from the PC 3 is outputted to the amplifying device 4 via the hub 1C, the audio processing unit 1D, and the switch 1F. In this manner, when the state is set to the recording state, the switch 1E connects the connector 1J with the hub 1C, and it is not possible to receive the audio data of the DAP 2 and transmit the audio data to the amplifying device 4. Therefore, the state is automatically set to the PC playback state. Accordingly, the audio data from the PC 3 can be played by the amplifying device 4 while transferring the audio file of the PC 3 to the DAP 2 and recording the audio file in the DAP 2. In other words, it is possible to record the audio file in the DAP 2 while the user listens to the audio of the PC 3.

The microcomputer 1A determines whether or not the instruction of canceling the recording state has been inputted (S27). For example, it is determined whether or not the record button 23 has been pressed for a long time. If the instruction of canceling the recording state has not been inputted (NO in S27), the process returns to S21. If the instruction of canceling the recording state has been inputted (YES in S27), the microcomputer 1A causes the switch 1E to connect the connector 1J with the host controller 1B. In other words, the microcomputer 1A cancels the recording state, and prevents the PC 3 from communicating with the DAP 2 via the USB and the audio file from the PC 3 from being transferred to the DAP 2 (S28). In this case, the DAP 2 can be charged by transmitting the charging command from the host controller 1B to the DAP 2.

It should be noted that after the cancellation of the recording state, the switch 1F maintains the connection between the audio processing unit 1D and the output terminal 1L. Accordingly, it is possible to avoid such a problem that the audio data from the PC 3 is not played by the amplifying device 4 by the cancellation of the recording state, when the user listens to the audio data of the PC 3 by playing the audio data by the amplifying device 4 while transferring the audio file of the PC 3 to the DAP 2 and causing the DAP 2 to record the audio file. The audio data from the DAP 2 is played by the amplifying device 4 after canceling the recording state by inputting the instruction of moving to the DAP playback state in S6 or by the DAP 2 starting to play in S14 in the process shown in FIG. 9.

According to the above processes, it is possible to move to or cancel the recording state, and switch from the PC playback state to the DAP playback state without connecting or disconnecting the cradle 1, the DAP 2, the PC 3, and the amplifying device 4 by the user operation. It should be noted that, the instruction of moving to the recording state in S21 and the instruction of canceling the recording state in S27 are not limited to the button operations, and can be remote control signals from the remote control transmitting unit 6 or control signals supplied from the amplifying device 4.

Figure 11:
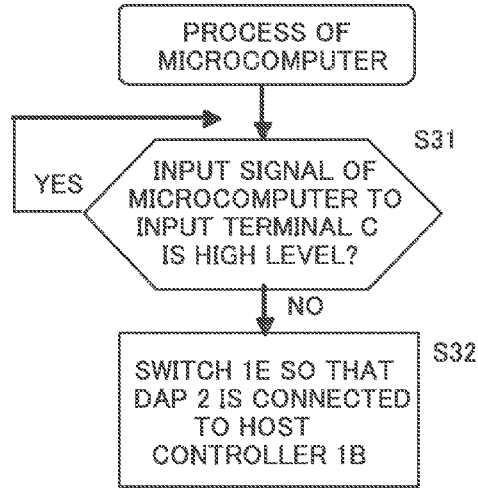
FIG. 11 is a flow chart showing a process of the microcomputer 1A.

Here, during the recording state, if the PC 3 is disconnected from the USB terminal 1K by the user, if the PC 3 is turned off, or if a communication failure in the USB occurs between the DAP 2 and the PC 3, without inputting the instruction of canceling the recording state, the charging command is not supplied to the DAP 2 from the host controller 3A of the PC 3 even though the switch 1E still connects the connector 1J with the hub 1C, and the DAP 2 cannot be charged. Therefore, as shown in FIG. 11, the microcomputer 1A determines whether or not the signal from the integration circuit 32 is high (S31). In other words, the microcomputer 1 determines whether or not the DAP 2 and the PC 3 in the power-on state are connected to the hub 1C. If the signal is not high (NO in S31), the microcomputer 1A causes the switch 1E to connect the connector 1J with the host controller 1B. Accordingly, the charging command is transmitted from the host controller 1B to the DAP 2, and the DAP 2 can be charged.

Figure 12:
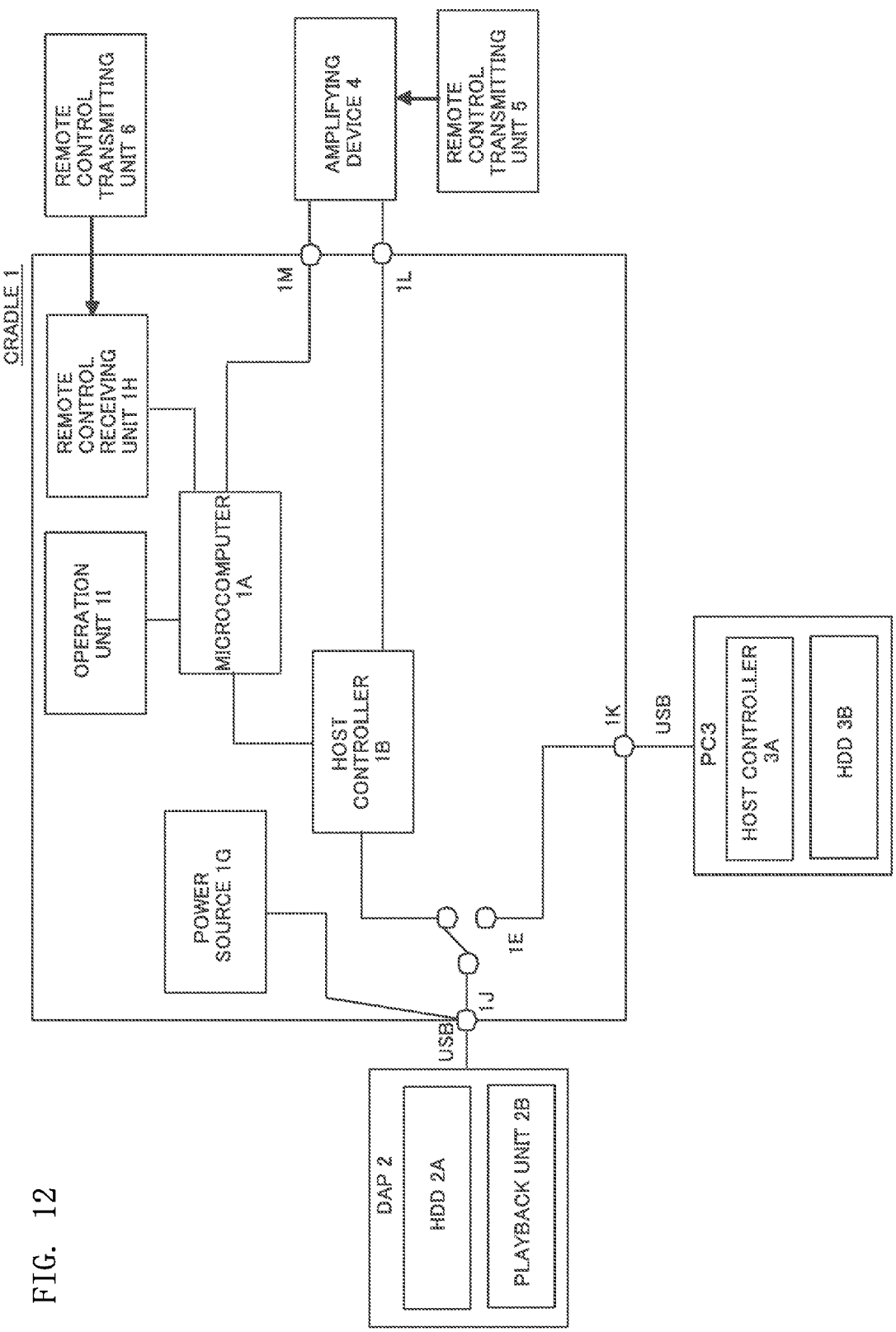
FIG. 12 is a block diagram illustrating the cradle 1 and such of another embodiment according to the present invention.
Figure 13:
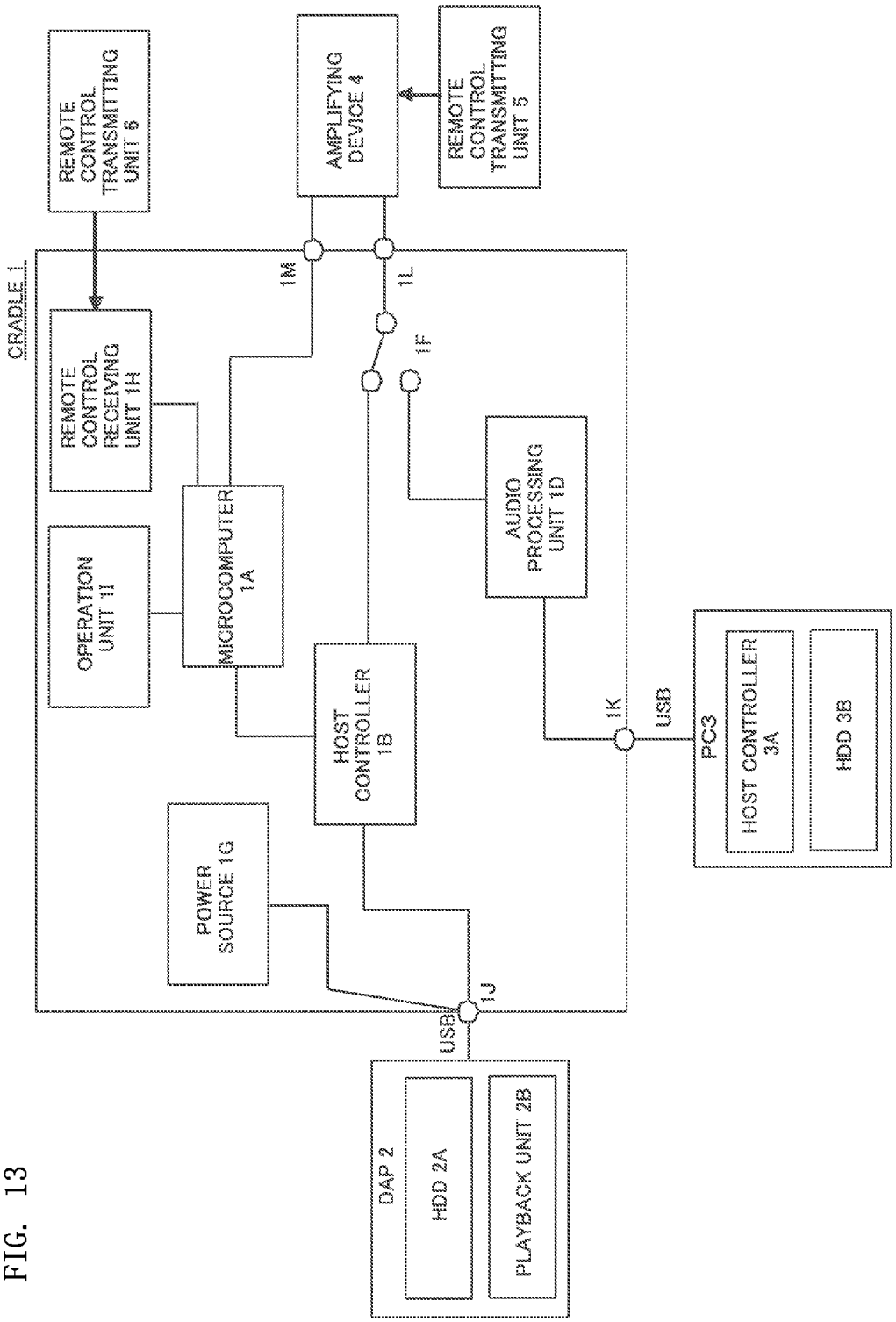
FIG. 13 is a block diagram illustrating the cradle 1 and such of another embodiment according to the present invention.

Although the above describes the preferred embodiments according to the present invention, the present invention is not limited to these embodiments. In view of solving the problem that the DAP 2 cannot receive the charging command and cannot be charged, the cradle 1 can include only the DAP playback state and the recording state and not the PC playback state. In this case, as shown in FIG. 12, the cradle 1 does not necessarily include the USB hub 1C, the audio processing unit 1D, and the switch 1F. In other words, the switch 1E is directly connected to the USB terminal (second connecting unit) 1K, and the host controller 1B can be directly connected to the output terminal 1L. Further, the cradle 1 can include only the DAP playback state and the PC playback state and not the recording state. In this case, as shown in FIG. 13, the cradle 1 does not necessarily include the USB hub 1C and the switch 1E. Moreover, the cradle 1 can be built within the PC 3, or within the amplifying device 4. Furthermore, video image data or still image data can be used instead of the audio data, and these data are collectively referred to as content data. The content data encoded by a predetermined format is referred to as a content file. Further, when the audio processing unit 1D carries out DA conversion of the audio data, an analog audio signal is outputted to the amplifying device 4. Moreover, the audio processing unit 1D can be connected between the cradle 1 and the amplifying device 4, instead of being built within the cradle 1. Furthermore, the present invention can be provided as a computer program for causing the computer to execute the above operation. The portable content playback apparatus can be such as a mobile phone, a portable vehicle navigation system, a portable television, a portable CD player, or a portable gaming machine.

What is claimed is:

1. A cradle comprising:
a first connecting unit to which the portable content playback apparatus is connectable;
a second connecting unit to which a computer is connectable;
an output unit that outputs content data;
a controller that controls the portable content playback apparatus;
a first switch that switches between connection of the first connecting unit to the controller and connection of the first connecting unit to the second connecting unit to which the computer is connectable;
a second switch; and
a switch control unit that controls switching of the first switch and the second switch, wherein
in a portable content playback apparatus playback state in which the content data is received from the portable content playback apparatus and outputted from the output unit, the switch control unit causes the first switch to connect the first connecting unit, which receives the content data from the portable content playback apparatus, with the controller, and at the same time the switch control unit also causes the second switch to connect the controller to the output unit to provide the content data to the output unit, and
when a content file from the computer is transferred to and recorded in the portable content playback apparatus, the switch control unit causes the first switch to connect the first connecting unit, to which the portable content playback apparatus is connectable, with the second connecting unit, to which the computer is connectable, and at the same time the switch control unit also causes the second switch to connect the output unit to the second connecting unit, to which the computer is connectable, in order to transfer the content file from the computer to the output unit.

2. The cradle according to claim 1 further comprising:
a hub that is connected to the second connecting unit, the first switch, and the second switch;
the second switch that switches between connection of the output unit to the controller and connection of the output unit to the second connecting unit by way of the hub, wherein
the first switch switches between connection of the first connecting unit to the controller and connection of the first connecting unit to the hub,
in the portable content playback apparatus playback state, the switch control unit causes the first switch to connect the first connecting unit, to which the portable content playback apparatus is connectable, with the controller, and causes the second switch to connect the output unit with the controller,
in a computer playback state in which the content data is received from the computer and outputted from the output unit, the switch control unit causes the second switch to connect the output unit with the hub, which is connected to the second connecting unit, and
when a content file from the computer is transferred to and recorded in the portable content playback apparatus, the switch control unit causes the first switch to connect the first connecting unit with the hub, which is connected to the second connecting unit.

3. The cradle according to claim 2, wherein
a downstream device is connected between the hub and the second switch, the downstream device receiving the content data from the computer through the hub and supplying the content data to the second switch, the downstream device being provided downstream with respect to the hub.

4. The cradle according to claim 2, wherein
when transferring the content file from the computer to the portable content playback apparatus and recording the content file in the portable content playback apparatus, the switch control unit causes the second switch to connect the output unit with the hub, which is connected to the second connecting unit, thereby controlling so as to be able to receive the content data from the computer and output the content data through the output unit.

5. The cradle according to claim 4, wherein
when canceling a state in which the content file from the computer is transferred to and recorded in the portable content playback apparatus, the switch control unit causes the first switch to connect the first connecting unit with the controller, and causes the second switch to maintain the connection of the output unit to the hub.

6. The cradle according to claim 2, further comprising:
a connection determination unit that determines whether or not the portable content playback apparatus is connected to the first connecting unit and whether or not the computer is connected to the second connecting unit, wherein when an instruction of outputting the content data from the portable content playback apparatus through the output unit has been inputted, if it is determined that the portable content playback apparatus is not connected to the first connecting unit, the switch control unit prevents the first switch and the second switch from switching, and when an instruction of outputting the content data from the computer through the output unit has been inputted, if it is determined that the computer is not connected to the second connecting unit, the switch control unit prevents the first switch and the second switch from switching.

7. The cradle according to claim 2, further comprising:

a first determination unit that determines whether or not the portable content playback apparatus is connected to the first connecting unit; and a second determination unit that determines whether or not the computer is connected to the second connecting unit when it is determined that the portable content playback apparatus has not been connected to the first connecting unit, wherein when it has been determined that the portable content playback apparatus is connected to the first connecting unit, the switch control unit causes the first switch to connect the first connecting unit with the controller, and causes the second switch to connect the output unit with the controller, and when it has been determined that the computer is connected to the second connecting unit, the switch control unit causes the first switch to connect the first connecting unit with the controller, and causes the second switch to connect the output unit with the hub.

8. The cradle according to claim 2, wherein the output unit is connectable with an amplifying device, and a playback state transmitting unit that transmits information regarding whether the cradle is in the portable content playback apparatus playback state or in the computer playback state to the amplifying device is further provided.

9. The cradle according to claim 8, wherein when the playback state of the cradle is changed to the portable content playback apparatus playback state or the computer playback state, or when the cradle is moved from a stand-by state to a power-on state, the playback state transmitting unit transmits the information regarding whether the cradle is in the portable content playback apparatus playback state or in the computer playback state to the amplifying device.

10. An amplifying device that is connectable to the output unit of the cradle according to claim 8, the amplifying device comprising:

an input unit to which content data is inputted from the cradle;

a playback state receiving unit that receives information regarding whether the cradle is in a portable content playback apparatus playback state or in a computer playback state from the cradle; and a display control unit that, based on the playback state of the cradle received by the playback state receiving unit, causes a display device to display information that the cradle is in the portable content playback apparatus playback state when the cradle is in the portable content playback apparatus playback state, and causes the display device to display information that the cradle is in the computer playback state when the cradle is in the computer playback state.

11. The amplifying device according to claim 10, wherein when the amplifying device is in a stand-by state, the playback state receiving unit receives the information regarding whether the cradle is in the portable content playback apparatus playback state or in the computer playback state from the cradle and stores the information in a storage device, and when the amplifying device moves from the stand-by state to the power-on state, the display control unit causes the display device to display the information that the cradle is in the portable content playback apparatus playback state when the cradle is in the portable content playback apparatus playback state, and causes the display device to display the information that the cradle is in the computer playback state when the cradle is in the computer playback state, based on the playback state of the cradle stored in the storage device.

12. A cradle capable of supplying a supply voltage for charging a portable content playback apparatus, the portable content playback apparatus carrying out a charging operation when communicating with a controller and not carrying out the charging operation when not communicating with a controller, the cradle comprising:

a first connecting unit to which the portable content playback apparatus is connectable;

a first controller that controls the portable content playback apparatus;

a second connecting unit to which a computer having a second controller is connectable;

a first switch that switches between connection of the first connecting unit, to which the portable content playback apparatus is connectable, to the first controller, and connection of the first connecting unit to the second connecting unit, to which the computer having the second controller is connectable; and a switch control unit that controls switching of the first switch, wherein when the switch control unit causes the first switch to connect the first connecting unit with the first controller, the first controller is caused to communicate with the portable content playback apparatus and to provide a charging command thereto, and when the switch control unit causes the first switch to connect the first connecting unit with the second connecting unit, the second controller within the computer is caused to communicate with the portable content playback apparatus and to provide a charging command thereto.

13. The cradle according to claim 12 further comprising:

an output unit that outputs content data;

a hub that is connected to the second connecting unit, the first switch, and a second switch;

the second switch that switches between connection of the output unit to the first controller and connection of the output unit to the second connecting unit by way of the hub, wherein the first switch switches between connection of the first connecting unit, to which the portable content playback apparatus is connectable, to the first controller and connection of the first connecting unit to the hub;

the switch control unit controls switching of the first switch and the second switch, and when the switch control unit causes the first switch to connect the first connecting unit with the hub, the second controller in the computer is caused to communicate with the portable content playback apparatus.

14. The cradle according to claim 13, wherein
the hub outputs a light emission control signal for controlling light emission of a light emitting device when it is detected that the portable content playback apparatus and the computer are connected the hub,
the switch control unit determines whether or not the portable content playback apparatus and the computer are connected to the hub based on the light emission control signal outputted from the hub, and
when it is determined to be not connected, the switch control unit causes the first switch to connect the first connecting unit with the first controller.

15. The cradle according to claim 14, wherein
the light emission control signal outputted from the hub is a PWM signal,
an integration circuit is further provided, the integration circuit integrating the light emission control signal to generate a control signal and supplying the generated control signal to the switch control unit, the control signal being at a first level when the portable content playback apparatus and the computer are connected to the hub and at a second level when at least one of the portable content playback apparatus and the computer is not connected to the hub, and
the switch control unit determines whether or not the portable content playback apparatus and the computer are connected to the hub based on the control signal supplied from the integration circuit.

* * * * *